United States Patent [19]
Bardon et al.

[11] Patent Number: 6,014,145
[45] Date of Patent: Jan. 11, 2000

[54] NAVAGATION WITH OPTIMUM VIEWPOINTS IN THREE-DIMENSIONAL WORKSPACE INTERACTIVE DISPLAYS HAVING THREE-DIMENSIONAL OBJECTS WITH COLLISION BARRIERS

[75] Inventors: Didier Daniel Claude Bardon, Austin; Richard Edmond Berry; Scott Harlan Isensee, both of Georgetown; Shirley Lynn Martin, Austin, all of Tex.

[73] Assignee: International Business Machines Corporation, Armonk, N.Y.

[21] Appl. No.: 08/888,804

[22] Filed: Jul. 7, 1997

[51] Int. Cl.⁷ .................................................. G06F 3/00
[52] U.S. Cl. .......................................... 345/427; 345/474
[58] Field of Search .................................. 345/427, 428, 345/429, 418, 419, 420, 474

[56] References Cited

U.S. PATENT DOCUMENTS

| | | | |
|---|---|---|---|
| 4,578,757 | 3/1986 | Stark | 364/461 |
| 5,047,916 | 9/1991 | Kondo | 364/167.01 |
| 5,056,031 | 10/1991 | Nakano et al. | 364/461 |
| 5,347,459 | 9/1994 | Greenspan et al. | 364/461 |
| 5,515,489 | 5/1996 | Yaeger | 395/152 |
| 5,528,735 | 6/1996 | Strasnick et al. | 345/427 |
| 5,548,694 | 8/1996 | Frisken Gibson | 395/124 |
| 5,561,742 | 10/1996 | Terada et al. | 395/90 |

*Primary Examiner*—Phu K. Nguyen
*Assistant Examiner*—Cliff N. Vo
*Attorney, Agent, or Firm*—Jerry Kraft; Volel Emile

[57] ABSTRACT

In a data processor controlled display system having three-dimensional objects laid out in a three-dimensional virtual workspace, the objects have associated there with respective collision barriers which are stored with their corresponding objects. Then during navigation via changing the users viewpoint in to the workspace, when this changing viewpoint encounters any collision barrier which is offset from its object by a selected distance D, the viewpoint stops. This distance of the barrier from the object is selected so as to stop the viewpoint at a distance sufficiently removed from its particular object so as to leave the user or viewer with a view of the workscape of sufficient scope to permit the viewer to select a different navigation path or path branch. In accordance with a further aspect of the present invention, the viewpoint is optionally provided with a similar collision barrier.

23 Claims, 5 Drawing Sheets

NAVAGATION WITH OPTIMUM VIEWPOINTS IN THREE-DIMENSIONAL WORKSPACE INTERACTIVE DISPLAYS HAVING THREE-DIMENSIONAL OBJECTS WITH COLLISION BARRIERS

CROSS-REFERENCE TO RELATED APPLICATION

Copending application "Climbability: A Property For Objects in 3-D Virtual Environment", J. Mullaly et al. (Attorney Docket No. AT9-97-212) relates to objects with barriers which viewpoints may climb over.

TECHNICAL FIELD

The present invention relates to user interactive computer supported display technology and particularly to such user interactive systems and methods which are user friendly, i.e. provide even non-computer-literate users with an interface environment which is easy to use and intuitive.

BACKGROUND OF THE INVENTION

The 1990's decade has been marked by a societal technological revolution driven by the convergence of the data processing industry with the consumer electronics industry. This advance has been even further accelerated by the extensive consumer and business involvement in the internet over the past two years. As a result of these changes, it seems as if virtually all aspects of human endeavor in the industrialized world requires human-computer interfaces. As a result of these profound changes, there is a need to make computer directed activities accessible to a substantial portion of the world's population which, up to a year or two ago, was computer-illiterate, or at best computer indifferent. In order for the vast computer supported market places to continue and be commercially productive, it will be necessary for a large segment of computer indifferent consumers to be involved in computer interfaces. Thus, the challenge of our technology is to create interfaces to computers which are as close to the real world as possible.

Industry has been working towards this challenge and there is presently a relatively high degree of realism possible in interfaces. This presents a need and an opportunity for even more realistic interaction techniques to better match the visual metaphors used and to achieve a higher level of ease of use for computer systems. We are striving towards the representation of object as photo realistic, three-dimensional (3D) models rather than as the icons and two-dimensional desktops of conventional computer technology.

Some examples of current technology for the creation of virtual three-dimensional workspace display interfaces are copending applications Ser. No. 08/813,891 filed Mar. 7, 1997, entitled "VIEWER INTERACTIVE OBJECT IN VIRTUAL THREE-DIMENSIONAL WORKSPACE" and Ser. No. 08/813,848 filed Mar. 7, 1997, entitled "VIEWER INTERACTIVE OBJECT WITH MULTIPLE SELECTABLE FACE VIEWS IN VIRTUAL THREE-DIMENSIONAL WORKSPACE", both assigned to the assignee of the present application.

A 3D virtual workspace display environment is also described in an article entitled, "RAPID CONTROLLED MOVEMENT THROUGH A VIRTUAL 3D WORKSPACE", Jock Mackinlay et al., *Computer Graphics Publication*, Vol. 24, No. 4, August 1990, pp. 171–175, as well as in its related U.S. Pat. No. 5,276,785.

It is clear that current technology in virtual three-dimensional workspaces has provided environments which are user friendly, i.e. make the casual computer user feel more comfortable and at home with the interface. However, researchers in human factors have found downsides to three-dimensional virtual reality displays. Because of the many choices that the user has in wandering down various "streets and roads" or visiting a wide variety of "buildings or stores" or going through many possible "doors", the user may wander through this reality and perhaps get lost from the track or goal he is pursuing.

The present invention addresses this problem, i.e. that of helping the interactive user in three-dimensional graphic environments to stay focused and relate to the paths he is seeking to travel to in the manner he is seeking to travel to reach objects even when these objects are arranged in 3D space in what appears to be infinite configurations. The invention facilitates the user's navigation in the 3D space so that the user may easily and quickly continue on his navigational path and stick to his navigational objectives. The invention aids the navigating viewer in relating to objects which could be impediments to his continued navigation.

SUMMARY OF THE INVENTION

It is understood that in order to navigate through three-dimensional space, view the space or relate to objects within the space, a viewpoint is determined within that space. That viewpoint is the virtual position of the viewer or person who is navigating within the three-dimensional space. The viewpoint is commonly defined by its position and its orientation or direction. For purposes of describing this invention, we will use the metaphor of a camera to understand the viewpoint. The camera's position and orientation are where it is and which way it is pointing. Let us refer to another property of a viewpoint which is "field of view"; this is effectively the resulting view from a given viewpoint. A key need of a viewer navigating through virtual three-dimensional space is to stay focused and navigate as easily as possible and thus permit this user to concentrate and focus on his planned tasks rather than the navigation itself.

The present invention provides a user aid in navigation by an arrangement which prevents the user viewpoint from colliding with objects or other three-dimensional impediments in the workspace, but more particularly stops the viewpoint short of the object or impediment at a position such that the viewpoint does not "bring the user's nose right up against the object or impediment." Rather, the viewpoint is stopped at a distance such that the user still has a view of reasonable scope from which he may select other paths or branches in his navigation. In other words, the user's field of view from the stopped viewpoint will be such that his further navigation will be facilitated. To this end, the present invention stores in association with each of a plurality of virtual three-dimensional objects, a collision barrier around the periphery of the object at a distance from the object such that any viewpoint stopped at the collision barrier will still have a reasonable field of view from which to select further navigational paths. Data defining such a collision barrier is stored in association with the data defining the respective object. Then, during the course of navigation when any viewpoint intersects such a collision barrier of a particular object the viewpoint, it is stopped. From the stopped viewpoint the user has the option or ability to reorient himself and select alternative paths or navigation branches.

In according to a more particular aspect of the present invention, the user of the display system is provided with means for interactively changing these collision barriers of particular objects in order to more specifically relate the system to his selected interactive function. In systems where the interactive user has the ability to alter objects or the content of objects, it is most desirable to give such users the further ability of changing the collision barriers associated with such changed objects to better relate these two desired interactive functions. This ability to change the collision barrier interactively is particularly desirable where the object is changing dynamically. In such a case, it is likely to be desirable that collision barrier be changed dynamically in response to the dynamically changed object. For example, if the functionally interactive object is one conveying readable information, the collision barrier may be at one distance when the readable material is graphics and at another distance perhaps closer when the readable material is text.

Collision boundaries or portions of them may be interactively turned off by the user to accommodate particular changes, especially in a dynamic environment as described above. Such turned-off collision boundaries may of course be interactively turned on again to accommodate other changes.

In accordance with another aspect of the present invention, the collision barrier may also be associated with a viewpoint, i.e., the viewpoint may have a collision barrier so that when the collision barrier of the viewpoint intersects the collision barrier of an object or the periphery of an object when the object has no collision barrier, then the viewpoint stops at such an intersection. Like that of objects, the collision barrier of a viewpoint may also be changed interactively so that the viewpoint is stopped at a relatively optimum distance from the object from which navigation may be continued.

In accordance with one aspect of the present invention, the objects may have preselected collision barriers dependant upon the properties of the objects as described above, and the viewpoint may have a collision barrier, the distance of which from the viewpoint may be changed in order to fine tune the stopping position of the viewpoint at a position most desirable for further navigation even in a changing workspace.

DETAILED DESCRIPTION OF THE PREFERRED EMBODIMENT

Figure 1:
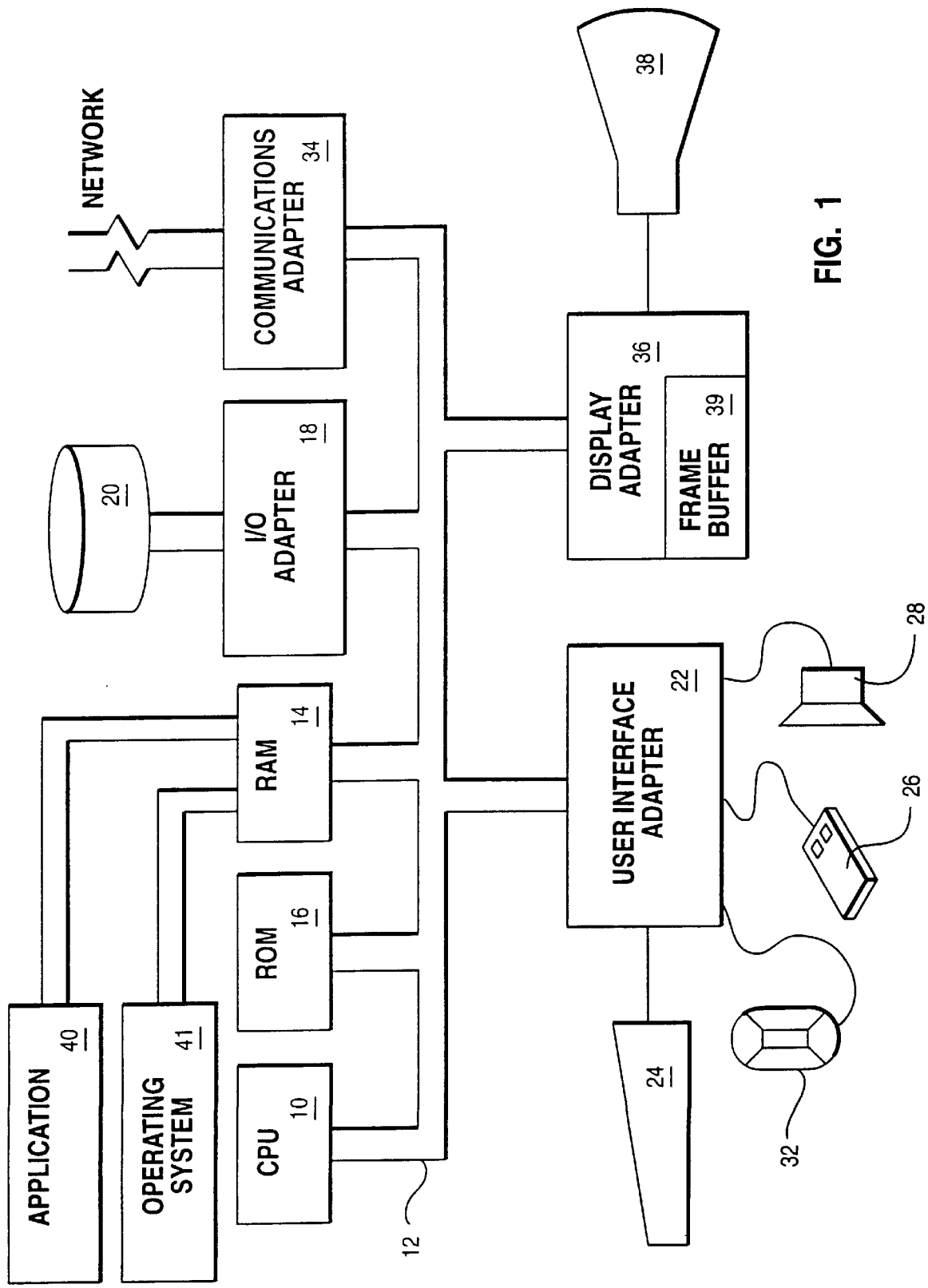
FIG. 1 is a block diagram of a data processing system including a central processing unit which is capable of implementing the present invention.

Before going into the details of specific embodiments, it will be helpful to understand from a more general perspective the various elements and method which may be used to implement the present invention. The present invention is implemented in three-dimensional virtual workspace. A three-dimensional workspace is a workspace that is perceived as extending in three orthogonal directions. Typically a display has a two-dimensional display surface and the perception of a third dimension is effected by visual clues such as perspective lines extending toward a vanishing point. Distant objects are obscured by nearer objects. The three-dimensional effect is also provided by showing changes in objects as they move toward or away from the viewer. Perspective shading of objects and a variety of shadowing of objects at different distances from the viewer also contribute to the three-dimensional effect.

A three-dimensional workspace is typically perceived as being viewed from a position within the workspace. This position is a viewpoint. This viewpoint provides the virtual interface between the display user and the display. The viewpoint's direction of orientation is the direction from the viewpoint into the field of view along the axis at the center of the field of view.

In order to present a three-dimensional workspace, a system may store data indicating "coordinates" of the position of an object, a viewpoint or other display feature in the workspace. Data indicating coordinates of a display feature can then be used in presenting the display feature so that it is perceptible as positioned at the indicated coordinates. The "distance" between two display features is the perceptible distance between them and can be determined from their coordinates if they are presented so that they appear to be positioned at their coordinates. It is in this manner that the distances of the collision barriers of this invention from their objects are established.

Techniques for providing and handling three-dimensional objects in a three-dimensional virtual workspace have been developed in the art and are available to display user interface designers. U.S. Pat. No. 5,276,785 (Mackinlay et al., Jan. 4, 1994) is an example of the design techniques available to such three-dimensional workspace interface designers.

The three-dimensional workspace or landscape is navigable using conventional three-dimensional navigation techniques. A user may move around or navigate within the three-dimensional data representation to alter his perspective and view of the displayed representation of the data. Thus, a user may be referred to as a navigator. The navigator is actually stationary, and his view of the display space changes to give him the sensation of moving within the three-dimensional graphical space. Thus, we speak in terms of the navigator's perceived motion when we refer to changes in his view of the display space. As the user moves, his view of the data changes accordingly within the three-dimensional data representation. Some navigation modes include browsing, searching and data movement. U.S. Pat. No. 5,555,354 (Strasnick et al., Sep. 10, 1996) describes some known navigation techniques.

The programs are written in human readable script and this script is provided to another program called a compiler to generate a machine readable numeric code which can be loaded into, and directly executed by the computer. The C++ language possesses certain characteristics which allow a software developer to easily use programs written by others while still providing a great deal of control over the reuse of programs to prevent their destruction or improper use. The C++ language is well known and many articles and text are available which describe the language in detail.

While the embodiment of the present invention, which will be subsequently described, can be implemented using object oriented techniques involving the C++ programming language, we found it preferable to use SCL as used in VRT: the Virtual Reality Toolkit developed and marketed by Superscape Ltd. having U.S. offices in Palo Alto, California.

Extensive details of these programming techniques may be found in the Superscape VRT, Reference Manual, Version 4-00, 2d Edition, Jan. 29, 1996.

It should be understood by those skilled in the art that object oriented programming techniques involve the definition, creation, use and instruction of "objects". These objects are software entities comprising data elements and routines, or methods, which manipulate the data elements. The data and related methods are treated by the software as an entity and can be created, used and deleted as such. The data and functions enable objects to model their real world equivalent entity in terms of its attributes, which can be presented by the data elements, and its behavior which can be represented by its methods. Thus, in implementing the present invention, the collision barrier associated with objects may be regarded and stored as part of the software entity.

Objects are defined by creating "classes" which are not objects themselves, but which act as templates which instruct a compiler how to construct the actual object. For example, a class may specify the number and type of data variables and the steps involved in the functions which manipulate the data. An object is actually created in the program by means of a special function called a constructor which uses the corresponding class definition and additional information, such as arguments provided during object creation, to construct the object. Objects are destroyed by a special function called a destructor.

Many benefits arise out of three basic properties of object oriented programming techniques, encapsulation, polymorphism and inheritance. Objects can be designed to hide, or encapsulate, all or a portion of, the internal data structure and the internal functions. More particularly, during program design, a program developer can define objects in which all or some of the data variables and all or some of the related method are considered "private" or for use only by the object itself. Other data or methods can be declared "public" or available for use by other software programs. Access to the private variables and methods by other programs can be controlled by defining public methods which access the object's private data. The public methods form an interface between the private data and external programs. An attempt to write program code which directly accesses the private variables causes a compiler to generate an error during program compilation. This error stops the compilation process and presents the program from being run.

Polymorphism allows objects and functions which have the same overall format, but which work with different data, to function differently to produce consistent results. For example, an addition method may be defined as variable A+variable B, (A+B). The same format can be used whether the A and B are numbers, characters or dollars and cents. However, the actual program code which performs the addition may differ widely depending on the type of variables which comprise A and B. Thus, each type of variable (numbers, characters and dollars). After the methods have been defined, a program can later refer to the addition method by its common format (A+B) and, during compilation, the compiler will determine which of the three methods to be used by examining the variable types. The compiler will then substitute the proper function code.

A third property of object oriented programming is inheritance which allows program developers to reuse pre-existing programs. Inheritance allows a software developer to define classes and the objects which are later created from them as related through a class hierarchy. Specifically, classes may be designated as subclasses of other base classes. A subclass "inherits" and has access to all of the public functions of its base classes as though these functions appeared in the subclass. Alternatively, a subclass can override some or all of its inherited functions or may modify some or all of its inherited functions by defining a new function with the same form.

The creation of a new subclass borrowing the functionality of another class allows software developers to easily customize existing code to meet their particular needs.

Although object oriented programming offers significant improvements over other programming concepts, program development still requires significant outlays of time and effort, especially if no pre-existing software programs are available for modification. Consequently, a set of predefined, interconnected classes are sometimes provided to create a set of objects and additional miscellaneous routines which are all directed to performing commonly encountered tasks in a particular environment. Such predefined classes and libraries are typically called "frameworks" and essentially provide a prefabricated structure as a basis for creating a working application program.

In object oriented programming such as the previously described VRT software platform, there is provided for the user interface a framework containing a set of predefined interface objects. The framework contains predefined classes which can be used as base classes and a developer may accept and incorporate some of the objects into these base classes, or he may modify or override objects or combinations of objects in these base classes to extend the framework and create customized solutions in particular areas of expertise.

This object oriented approach provides a major advantage over traditional programming since the programmer is not changing the original program, but rather extending the capabilities of the original program.

The above-described Superscape Virtual Reality Toolkit (VRT) provides the architectural guidance and modeling, but at the same time frees developers to supply specific actions unique to the particular problem domain which the developer is addressing. Those skilled in the art will understand how the present invention is implemented using object oriented programming techniques as described above.

With this background of the various expedients which may be used to implement the present invention, the preferred embodiments will now be described.

Referring to FIG. 1, a typical data processing system is shown which may be used in conjunction with object oriented software in implementing the present invention. A central processing unit (CPU), such as one of the PowerPC microprocessors available from International Business Machines Corporation (PowerPC is a trademark of International Business Machines Corporation) is provided and interconnected to various other components by system bus 12. An operating system 41 runs on CPU 10 and provides control and is used to coordinate the function of the various components of FIG. 1. Operating system 41 may be one of the commercially available operating systems such as DOS, or the OS/2 operating system available from International Business Machines Corporation (OS/2 is a trademark of International Business Machines Corporation). A program application such as the program in the above-mentioned VRT platform 40 runs in conjunction with operating system 41 and provides output calls to the operating system 41 which implements the various functions to be performed by the application 40.

A read only memory (ROM) 16 is connected to CPU 10, via bus 12 and includes the basic input/output system (BIOS) that controls the basic computer functions. Random access memory (RAM) 14, I/O adapter 18 and communications adapter 34 are also interconnected to system bus 12. It should be noted that software components including the operating system 41 and application 40 are loaded into RAM 14 which is the computer system's main memory. I/O adapter 18 may be a small computer system interface (SCSI) adapter that communicates with the disk storage device 20, i.e. a hard drive. Communications adapter 34 interconnects bus 12 with an outside network enabling the data processing system to communicate with other such systems over a local area network (LAN), wide area network (WAN), or the like. I/O devices are also connected to system bus 12 via user interface adapter 22 and display adapter 36. Keyboard 24, trackball 32, mouse 26 and speaker 28 are all interconnected to bus 12 through user interface adapter 22. Display adapter 36 includes a frame buffer 39 which is a storage device that holds a representation of each pixel on the display screen 38. Images may be stored in frame buffer 39 for display on monitor 38 through various components such as a digital to analog converter (not shown) and the like. By using the aforementioned I/O devices, a user is capable of inputting information to the system through the keyboard 24, trackball 32 or mouse 26 and receiving output information from the system via speaker 28 and display 38.

There will now be described a simple illustration of the present invention. When the images are described, it will be understood that these may be rendered by storing a virtual reality three-dimensional image creation program such as the previously described VRT of Superscape in the RAM 14 of the system of FIG. 1. Also stored on the RAM will be a suitable operating system such as DOS or Windows. The operating system of the VRT application is diagrammatically shown in FIG. 1 as operating system 41 in which application 40 operates.

Figure 2:
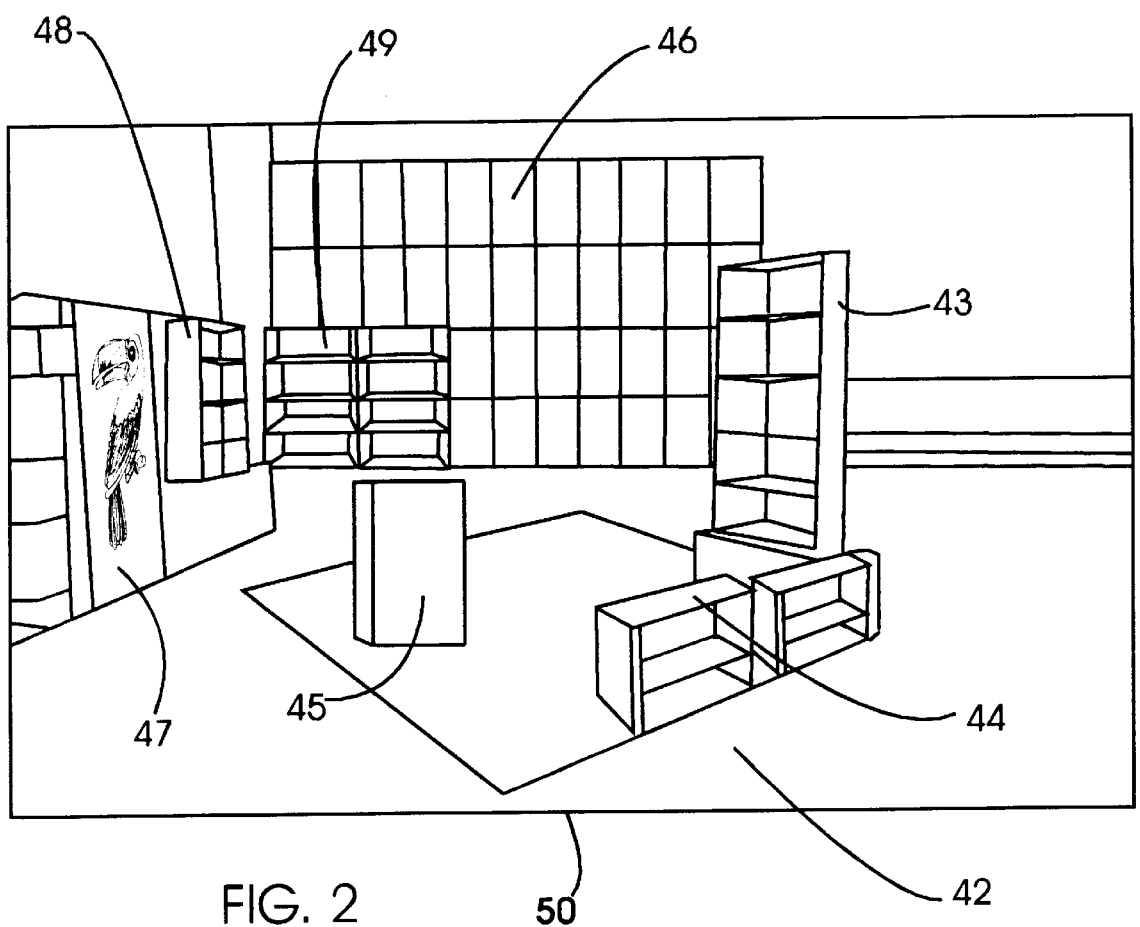
FIG. 2 is a selected three-dimensional workspace filled with a variety of objects.

An embodiment of the present invention will now be described starting with respect to the task specific portion of a virtual reality three-dimensional workspace shown in FIG. 2. Workspace 42 has many objects, among them: bookshelves 43, desk 44, podium 45, window wall 46, painting 47, shelves 48 and 49. Let us consider the image in FIG. 2 a view point of a three-dimensional space presented to the viewer at a display interface such as that which could be shown on display monitor 38 of FIG. 1. In accordance with conventional techniques, the user may control the viewpoint 50 through conventional I/O devices such as mouse 26 in FIG. 1 which operates through user interface 22 to call upon the VRT programs in RAM 14 cooperating with the operating system 41 to create the images in frame buffer 39 of display adapter 36 to control the display on monitor 38. Using conventional virtual three-dimensional workspace navigation techniques, the viewpoint interface of the user shown in FIG. 2 is changeable as the user moves closer or backs away from objects in the workspace or moves to the right or left in the workspace. All this may be controlled by a suitable I/O device such as mouse 26 of FIG. 1.

Figure 3:
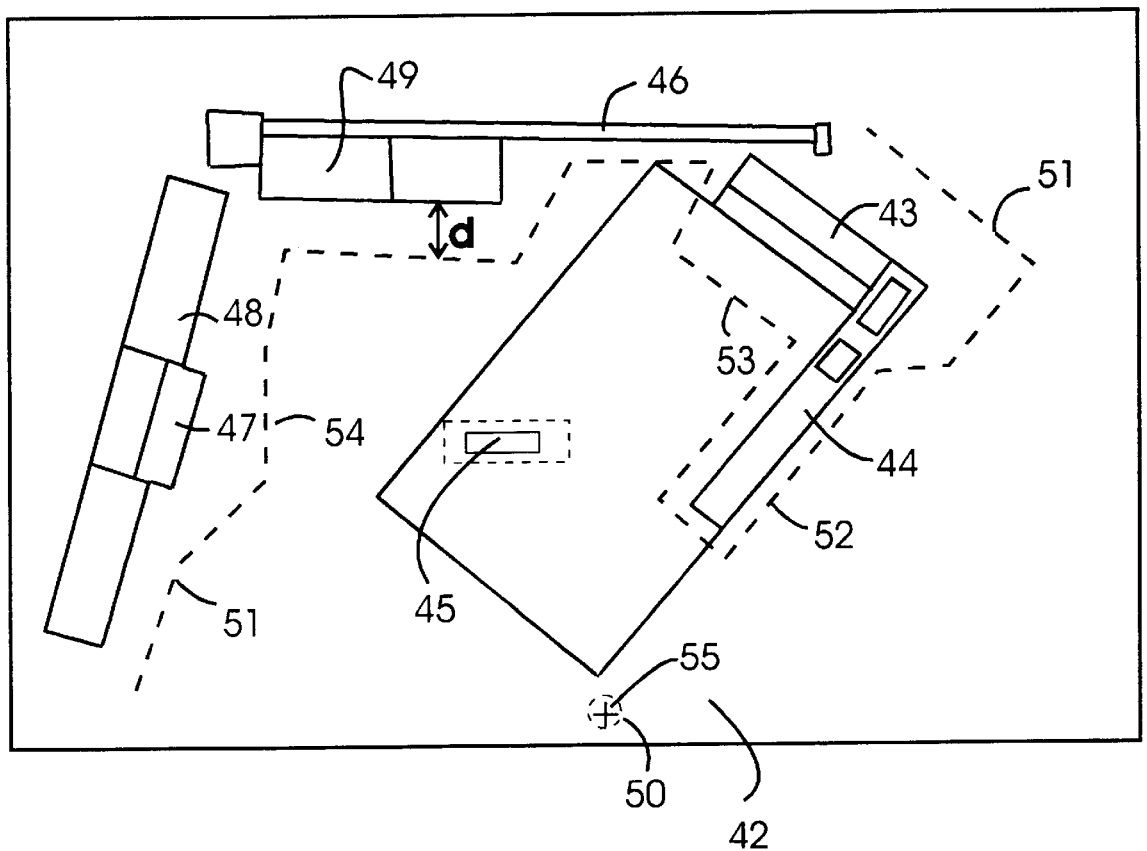
FIG. 3 is a diagrammatic representation of a top or planned view of the workspace of FIG. 2 with the collision barriers surrounding objects and the viewpoint being shown as dashed lines.

While for simplicity of illustration, the view of the workspace shown in FIG. 3 which is a top view of the space shown in three dimensions in FIG. 2 is presented in a single plane in FIG. 3, it should be understood that the movement may be along any path in the three orthogonal: x y and z directions.

With reference to FIG. 3, the viewpoint 50 which is the point from which the field of view shown in FIG. 2 is viewed by the user, is shown as crosspoint 50. The workplane 42 of FIG. 3 has all of the objects in FIG. 2 presented in a plan or overhead view: bookcase 43, desk 44, podium 45, window wall 46, painting 47, shelves 48 and bookcase 49. The collision barrier associated with each of these objects is shown as a continuous dashed line 51 spaced from these objects by a distance d which varies with the nature of the object. Thus the section 52 of collision barrier 51 which is close to desk 44 is at a relatively short distance from the periphery of the desk 44. The reason for this is that desk 44 as shown in FIG. 2 is a low lying impediment. Thus, when the viewpoint is stopped short of the object by the collision barrier, the viewpoint will be such that the user can easily select the navigational path or branch since he will be able to see over the low lying object. On the other hand, the section 53 of the collision barrier 51 which is near bookcase 43 is at a relatively substantial distance from the bookcase. As seen from FIG. 2 bookcase 43 is quite tall and the viewer at the stopped viewpoint adjacent to bookcase 43 must have a viewpoint that is distanced so that he can see around the bookcase in order to decide the most appropriate navigational path. Similarly, section 54 of collision barrier 51 near painting 47 is also at a substantial distance from it's painting object 47. This is because the painting in combination with shelves 48 is a formidable and tall barrier from which the viewer has to be distanced in order to best select an alternate navigational path. In addition, the distance at section 54 provides the viewer or user with an optimum distance from which he may if he desires study painting 47.

As set forth hereinabove, in accordance with an additional aspect of the present invention the viewpoint 50 may have an optional viewpoint collision barrier which is depicted in top view of FIG. 3 as dashed line 55. Thus if collision barrier 55 is optionally turned on, then the viewpoint will stop when viewpoint collision barrier 55 touches object collision barrier 53 at any point. On the other hand if the viewpoint collision barrier 55 is not turned on, then the viewpoint 50 will stop when it touches object collision barrier 51.

It should be understood that both the object collision barrier 51 and viewpoint collision barrier 55 if the later is optionally rendered operational, may both be setup so as to be interactively changeable by the user i.e., user may interactively change distance d or change the distance from collision barrier 55 to the viewpoint. This is usually desirable in systems where the user may interactively alter his objects or their positions. In such a case, the user may need the ability to change object collision barriers to accommodate changes in potential navigation views brought about by such changes in the objects. Even further, there may be systems in which the system itself under certain circumstances may automatically change objects. In such cases, the system may be setup so as to automatically also alter the collision barriers to accommodate the change in potential navigational views resulting in such object changes.

Figure 4A:
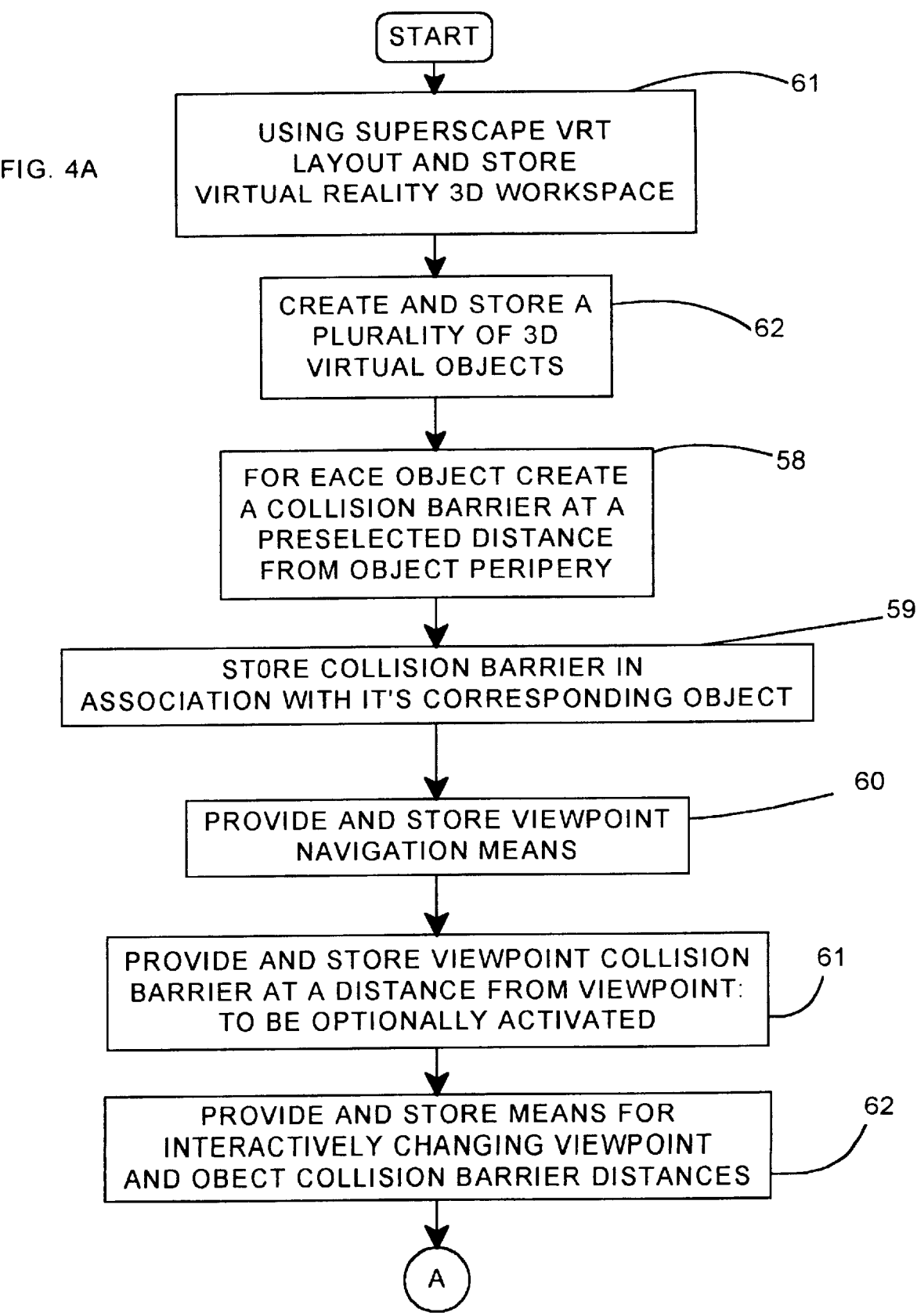
FIGS. 4A and 4B are flowcharts of the process implemented by the present invention (FIG. 4A) and for navigating through the three-dimensional workspace layout (FIG. 4B).
Figure 4B:
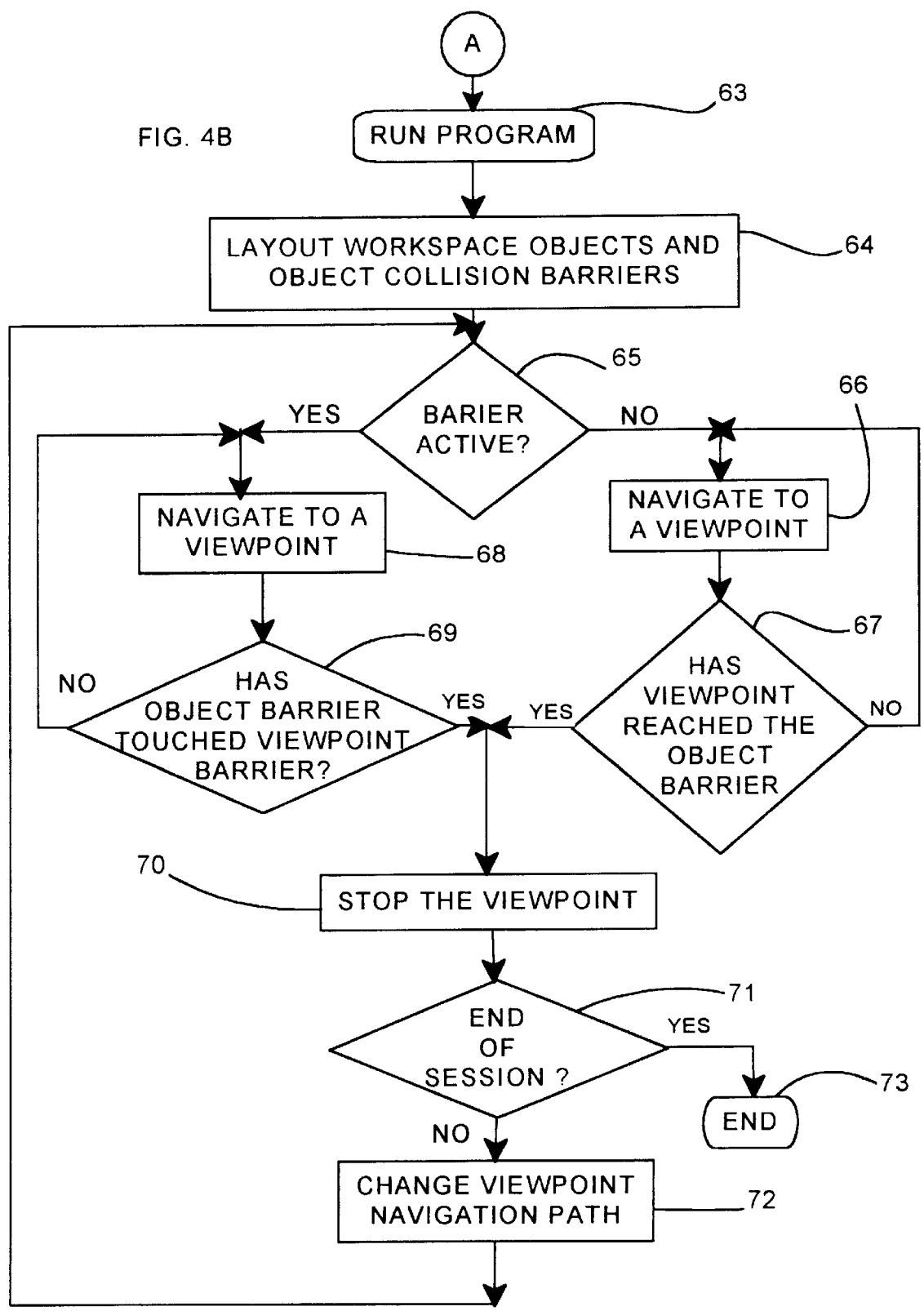

Now with reference to FIGS. 4A and 4B, we will describe a process implemented by the present invention in conjunction with the flowcharts of FIGS. 4A and 4B. First, the steps in FIG. 4A relate to the development of the virtual reality workscape, the functional object and their positioning in the workscape in accordance with the present invention using the previously described Superscape VRT programming toolkit. It also includes the development for each object of a collision barrier at a preselected distance from the object periphery. First, step 56, the desired virtual reality three-dimensional workspace is created and stored. This would be, for example, the workspace shown in FIG. 2 and diagrammatically shown as a plan view of FIG. 3. Next, step 57, the virtual reality three-dimensional objects which will be placed in a landscape are created and stored. Then, step 58, a collision barrier is selected for each object at a preselected distance from the object periphery. Then, step 59, such collision barriers are stored in association with their respective corresponding objects.

Next, step 60, there is provided and stored navigation means for changing the viewpoint of the viewer at the display interface responsive to the viewer interactively selecting appropriate navigation paths. These navigation means can be any conventional navigation means either for proceeding along a particular path. Next, step 61, a viewpoint collision barrier is created and stored. This barrier will be a preselected distance from the viewpoint and will normally be inactive but may be optionally activated. Then, step 62, means are provided and stored for interactively changing both the object and viewpoint collision barrier distances.

The process now proceeds to point A in FIG. 4B whereat the created virtual reality landscape program is run, step 63. As previously mentioned, the program is run on a system such as that shown in FIG. 1 with particular application programs being loaded on RAM 14, connected to display buffer 36 which forms the stored images via frame buffer 39 controlling the display monitor 38. The program initially sets up the workspace layout on the display, step 64; this includes laying out the objects as well as their corresponding object collision barriers. Now, before there is any navigation by means of moving a viewpoint a determination is made, decision step 65 as to whether the viewpoint collision barrier is active. Let us first assume that the collision barrier around the viewpoint is not active, resulting in a no from step 65; the system then begins to navigate through a sequence of viewpoints, step 66. At each sequential viewpoint, a decision or determination is made, step 67 as to whether the viewpoint has reached an object collision barrier. If it has not, then the system returns to navigation step 66 and the navigation through a sequence of viewpoints along a particular path continues. On the other hand, if the decision from step 67 is that an object collision barrier has been reached, the viewpoint stops, step 70.

Considering now the flow of the process from decision step 65 if it is determined that the viewpoint has its optional collision barrier active, then the system proceeds to step 68 where the viewpoint is navigated and a determination is made, step 69, as to whether the object collision barrier has touched or intersected the viewpoint collision barrier. If it has not, then the system returns to step 68 and the navigation continues. On the other hand if a determination is made in decision step 69 that the object collision barrier has intersected the viewpoint collision barrier, then the viewpoint is stopped again, step 70.

At this point, decision step 71, a determination is made as to whether the user wishes to end the session. Such decisions may be made by the user all along in the process. If it is the end of the session, yes from step 71, then the session is ended step 73. On the other hand, if the session is to continue, then step 72, the user is now stopped at a point where he may conveniently consider his options in selecting a changed navigation path from the stopped viewpoint. After he changes the navigation path, the flow returns to decision step 65 from this new navigation path, and the process continues as described above.

Although certain preferred embodiments have been shown and described, it will be understood that many changes and modifications may be made therein without departing from the scope and intent of the appended claims.

We claim:

1. A data processor controlled display system for displaying a virtual three-dimensional workspace comprising:
    means for displaying a plurality of virtual three-dimensional objects within said workspace;
    user interactive navigation means for moving users to a plurality of viewpoints within said workspace;
    means for storing in association with each of a plurality of said virtual objects, a collision barrier around the periphery of the object at a selected distance from the object, and
    means responsive to moving a user to a viewpoint intersecting the collision barrier of a selected object for stopping the viewpoint at said barrier.

2. The display system of claim 1 further including user-interactive means for changing the distance of a collision barrier from its associated object.

3. The display system of claim 1 further including means for changing at least one of said plurality of virtual three dimensional objects, and means responsive to said change for changing the distance of the collision barrier of said changed object from said changed object.

4. The display system of claim 3 wherein said means for changing said object, dynamically change said object.

5. The display system of claim 1 further including
    viewpoint collision barrier means tracking each of said viewpoints during navigation at a selected distance from said viewpoint, and
    means, responsive to moving a user to a viewpoint whereat the viewpoint collision barrier intersects the collision barrier of an object, for stopping said viewpoint.

6. The display system of claim 5, further including means, responsive to moving a user to a viewpoint whereat the viewpoint collision barrier intersects the periphery of an object without a collision barrier, for stopping said viewpoint.

7. A computer implemented method for displaying a virtual three-dimensional workspace comprising:
    displaying a plurality of virtual three-dimensional objects within said workspace;
    user-interactively moving users to a plurality of viewpoints within said workspace;
    storing in association with each of a plurality of said virtual objects, a collision barrier around the periphery of the object at a selected distance from the object, and
    responsive to moving a user to a viewpoint intersecting the collision barrier of a selected object, stopping the viewpoint at said barrier.

8. The method of claim 7 further including the step of changing the distance of a collision barrier from its associated object.

9. The method of claim 7 further including
    the step of changing at least one of said plurality of virtual three dimensional objects, and
    responsive to said change, the step of changing the distance of the collision barrier of said changed object from said changed object.

10. The method of claim 9 wherein said object is dynamically changed.

11. The method of claim 7 further including the steps of:
    providing a viewpoint collision barrier tracking each of said viewpoints during navigation at a selected distance from said viewpoint, and
    responsive to moving a user to a viewpoint whereat the viewpoint collision barrier intersects the collision barrier of an object, stopping said viewpoint.

12. A computer program having data structures included on a computer readable medium which causes the display on a data processor supported display of a virtual three-dimensional workspace comprising:

means for displaying a plurality of virtual three-dimensional objects within said workspace;

user interactive navigation means for moving users to a plurality of viewpoints within said workspace;

means for storing in association with each of a plurality of said virtual objects, a collision barrier around the periphery of the object at a selected distance from the object, and means responsive to moving a user to a viewpoint intersecting the collision barrier of a selected object for stopping the viewpoint at said barrier.

13. The computer program according to claim 12 further including user-interactive means for changing the distance of a collision barrier from its associated object.

14. The computer program according to claim 12 further including means for changing at least one of said plurality of virtual three dimensional objects, and means responsive to said change for changing the distance of the collision barrier of said changed object from said changed object.

15. The computer according to claim 14 wherein said means for changing said object, dynamically change said object.

16. The computer program according to claim 12 further including viewpoint collision barrier means tracking each of said viewpoints during navigation at a selected distance from said viewpoint, and means, responsive to moving a user to a viewpoint whereat the viewpoint collision barrier intersects the collision barrier of an object, for stopping said viewpoint.

17. The computer program according to claim 16, further including means, responsive to moving a user to a viewpoint whereat the viewpoint collision barrier intersects the periphery of an object without a collision barrier, for stopping said viewpoint.

18. A data processor controlled display system for displaying a virtual three-dimensional workspace comprising:

means for displaying a plurality of virtual three-dimensional objects within said workspace;

user interactive navigation means for moving users to a plurality of viewpoints within said workspace;

viewpoint collision barrier means tracking each of said viewpoints during navigation at a selected distance from said viewpoint, and means, responsive to moving a user to a viewpoint whereat the viewpoint collision barrier intersects the periphery of an object, for stopping said viewpoint.

19. The display system of claim 18, further including means changing the distance of said collision barrier from said viewpoint.

20. A computer implemented method for displaying a virtual three-dimensional workspace comprising:

displaying a plurality of virtual three-dimensional objects within said workspace;

user-interactively moving users to a plurality of viewpoints within said workspace;

providing a viewpoint collision barrier tracking each of said viewpoints during navigation at a selected distance from said viewpoint, and responsive to moving a user to a viewpoint whereat the viewpoint collision barrier intersects the periphery of an object, stopping said viewpoint.

21. The method of claim 20 further including the step of changing the distance of said collision barrier from said viewpoint.

22. A computer program having data structures included on a computer readable medium which causes the display on a data processor supported display of a virtual three-dimensional workspace comprising:

means for displaying a plurality of virtual three-dimensional objects within said workspace;

user interactive navigation means for moving users to a plurality of viewpoints within said workspace;

viewpoint collision barrier means tracking each of said viewpoints during navigation at a selected distance from said viewpoint, and means, responsive to moving a user to a viewpoint whereat the viewpoint collision barrier intersects the periphery of an object, for stopping said viewpoint.

23. The computer program according to claim 22, further including means changing the distance of said collision barrier from said viewpoint.

\* \* \* \* \*